United States Patent [19]

Gillissen

[11] Patent Number: 4,691,130
[45] Date of Patent: Sep. 1, 1987

[54] PROCESS FOR THE GENERATION PLASMA AND AN MHD GENERATOR

[76] Inventor: Franz Gillissen, Ahornstrasse 8, Kerpen-Turnich, Fed. Rep. of Germany

[21] Appl. No.: 834,324

[22] PCT Filed: Jul. 5, 1985

[86] PCT No.: PCT/EP85/00271
§ 371 Date: Mar. 10, 1986
§ 102(e) Date: Mar. 10, 1986

[87] PCT Pub. No.: WO86/00180
PCT Pub. Date: Jan. 3, 1986

[30] Foreign Application Priority Data

Jun. 7, 1984 [DE] Fed. Rep. of Germany ....... 3421129
May 29, 1985 [DE] Fed. Rep. of Germany ....... 3519162

[51] Int. Cl.$^4$ ............................................. H02N 4/02
[52] U.S. Cl. ................................................. 310/11
[58] Field of Search .......................................... 310/11

[56] References Cited

U.S. PATENT DOCUMENTS

| | | | |
|---|---|---|---|
| 3,406,301 | 10/1968 | Rosa | 310/11 |
| 3,414,745 | 12/1968 | Bidard | 310/11 |
| 3,459,975 | 8/1969 | Rosner | 310/11 |
| 3,480,805 | 11/1969 | Yerrell | 310/11 |
| 3,515,912 | 6/1970 | Wilkinson | 310/11 |
| 3,525,886 | 8/1970 | Radebold | 310/11 |
| 3,586,890 | 6/1971 | Klein et al. | 310/11 |
| 3,663,360 | 5/1972 | Post | 310/11 X |
| 4,134,034 | 1/1979 | Dardai | 310/11 |

Primary Examiner—Donovan F. Duggan
Attorney, Agent, or Firm—Chilton, Alix & Van Kirk

[57] ABSTRACT

The invention relates to a process for the generation of a plasma by heating up a flowing gas and an MHD generator for performing the said process in order to achieve the generation of electrical power in an economical manner. For this purpose there are generated in a flow cavity at least two gas flows which move helically and with the same helical direction around the stray flux lines of an axial external magnetic field and are directed at each other in a manner such that they meet one another in the central region of the flow cavity and at that point form a turbulent current center where they are heated up by means of an initial ignition in a manner such that, on the magnetoplasma- or magnetohydrodynamic principle, electrical energy is generated which effects a self-organized heating up and boost heating of the gas, the Hall currents generated in the heated-up gas producing axially parallel magnetic fields which lead to a compression by the pinch effect and to a further heating up of the gas to a plasma or a hot plasma. The MHD generator for performing this process consists essentially of a flow cavity with a multiplicity of flow channels aligned to each other which are disposed adjacently to magnets and have tangential gas inlets for the generation of helical currents.

20 Claims, 3 Drawing Figures

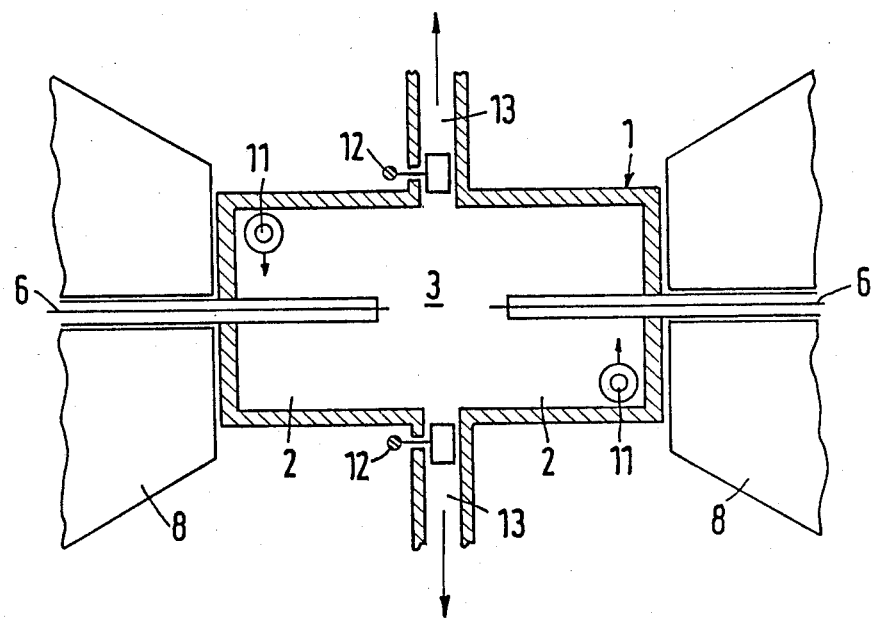

PROCESS FOR THE GENERATION PLASMA AND AN MHD GENERATOR

The invention relates to a process and apparatus for the generation of a plasma according to the preamble of Claim 1, and to an MHD generator by heating a flowing gas.

An MHD generator serves to generate electrical power directly from thermal energy without mechanically moved parts. The thermally ionized gas necessary for this purpose is, in general, generated externally and injected into the MHD generator. In this connection the heat needed for the heating of the gas is supplied from fossil fuels or nuclear reactors. As a result of the initial Hall effect a voltage, which can be tapped off by means of electrodes and fed to a load, is induced perpendicularly to the gas flow and to the magnetic field direction. The gas emerging still has such a high temperature that it is still capable of supplying the energy for a conventional thermoelectric process. The use of an MHD generator for obtaining energy is therefore very effective.

The use of an MHD generator for the generation of electric power is, however, at the present time still associated with great difficulties since, on the one hand, the devices for the heating up of the gas have to be made available and on the other hand, the temperatures of the plasma produce a severe stressing of the materials.

The object of the invention is therefore to provide a process or an MHD generator in which no external gas plasma source is needed and the generation of electric power is made possible in an economical manner.

For the generation of a hot plasma and/or of an electric current a flow cavity is provided for this purpose which is constructed as a spatially shaped flow system with an enclosed flow field. This flow system at the same time comprises at least two flow channels which enclose a common space, there being generated in each case a gas flow which moves in approximately helical paths rotating in the same direction around the flux lines of the axial magnetic field towards the common space, in the region of which a turbulent current centre is formed which permits the heating up of the gases flowing in and out to form a plasma.

The MHD generator may, in particular, be constructed in a manner such that the flow cavity is tetrahedral with fow channels directed tetrahedrally to one another. A symmetrical arrangement of the flow cavity of this type makes possible the generation of a plasma sphere in the region of the central point of the tetrahedron with spikelike spurs which is supported magnetohydrodynamically in an environment of opposite polarity. The spatial and the functional combination of the helical gas flow flowing in and the hot gas flow flowing out permits a direct recovery of heat during the process. As a result of the spherical containment of the plasma in the interior of the flow cavity the plasma is in addition limited and makes possible a permanent enclosure of a very high temperature plasma. The said enclosure can be promoted by a stray magnetic field which leaves the central region of the flow cavity field-free with the result that the central plasma is not retarded in its movement, and a steep magnetic field gradient towards the magnetic field ensures that the plasma is not disturbed and therefore preferentially organizes itself. A strong electrodynamic coupling in of hydrodynamic energy into the central plasma can consequently be achieved with the result that relatively high plasma densities of the contained plasma can be achieved. The particular advantage of a central plasma of this type consists in the fact that the technological and thermal wall problems are reduced. Moreover, the energy of the gases flowing out can be used to preheat the helical gas flows, and/or to generate electrical energy by means of Laval nozzles which are disposed at the gas exit orifices of the flow channels. The flow cavity can furthermore be used as a combustion chamber by giving it a two-shell construction and providing a fuel supply device.

The flow cavity can also be constructed as a circular cylindrical flow chamber with two opposite flow channels which are disposed between two magnets. In a flow cavity of this type two opposite gasflows are generated which describe approximately helical paths around the flux lines of the axial magnetic field and meet each other in the region of the common space where they form a turbulent current centre.

With the MHD generator according to the invention the plasma, generated by an initial ignition, for example, by an electric arc or by means of plasma guns is transformed into a turbulent current movement with the result that a balancing of the electromotive force produced by the MHD principle is brought about and an automatic heating-up of the gas plasma is achieved. In particular, the pinch effect leads to a self-compression of the plasma, as a result of which the plasma is compressed and heated up. Furthermore, the hot gases flowing out generate voltages which can be fed to a load or can be coupled into the turbulent current region of the flow cavity for the achievement of very high plasma temperatures. A medium which conducts electricity poorly or not al all, for example water vapour, can thus be used directly for the generation of current. The generation of electrical energy can also be improved by the modification of the spatial configuration of the flow cavity.

The MHD generator consequently makes possible a considerable generation of electrical energy using a structure which is not expensive, excessive temperature stressing of the flow cavity being prevented by the separating action of the relatively cool helical current in combination with the pinch effect.

Further arrangements of the invention are to be found in the description below and in the sub-claims.

The invention is explained below with reference to the exemplary embodiments as shown in the accompanying figures, in which:

FIG. 3 shows in cross-section a third exemplary embodiment of the MHD generator.

Figure 1:
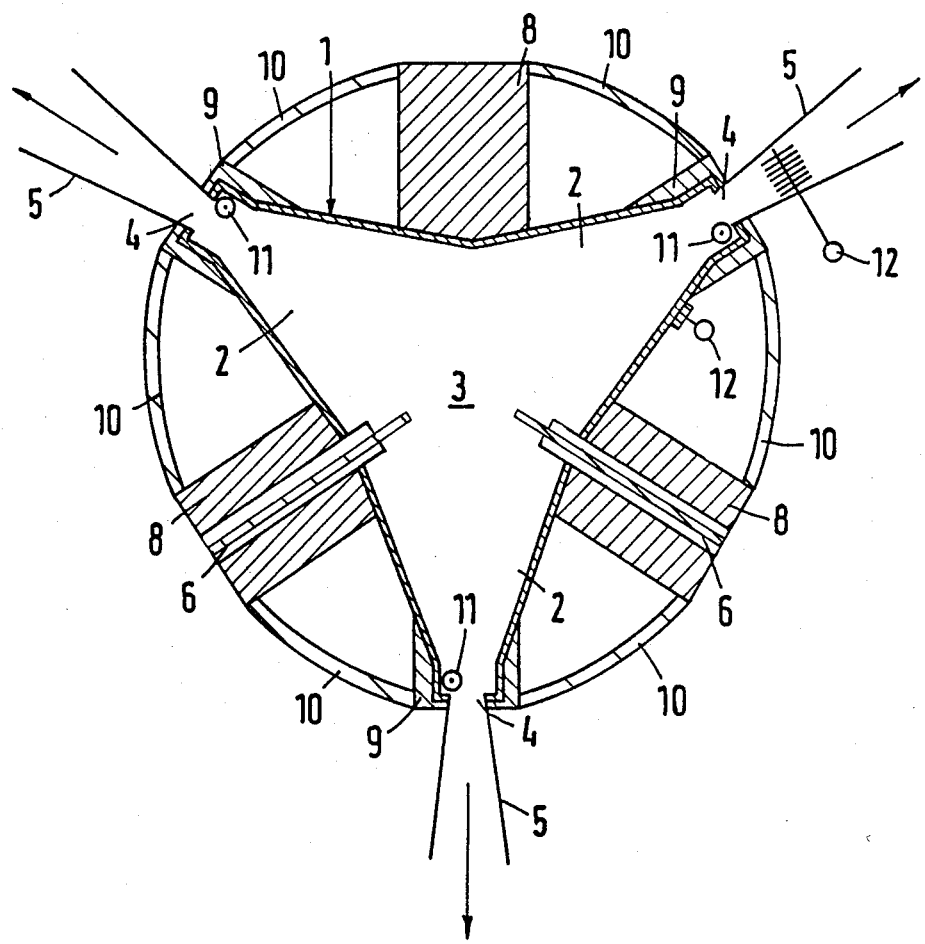
FIG. 1 shows in cross-Section a first exemplary embodiment of the MHD generator.

The MHD generator shown in FIG. 1 comprises a tetrahedrally shaped multi-channel flow system having a flow cavity 1 which is formed from four flow channels 2 directed tetrahedrally to each other and a common space 3 enclosed by the latter. The flow channels 2 are at the same time constructed in a manner such that the totality of their bounding surfaces form the tetrahedal cavity 1. Each flow channel 2 consequently defines a tetrahedral apex and extends, with its diameter continuously increasing, in the direction of the centre point of the tetrahedron. Starting from the four corners of the tetrahedron, all the flow channels 2 are therefore directed towards the centre point of the tetrahedron and form at that point the common space 3 in which all the flow channels 2 terminate. The flow channels 2 and the common space 3 define a flow field which is limited by the flow cavity 1. At each apex of the tetrahedron an channel exit orifice 4 is provided in which the particular flow channel 2 terminates externally. To exploit the residual dynamics of the emerging gas flows each channel exit orifice has also a Laval nozzle 5 which expands outwards. To perform an initial ignition at least two ignition electrodes 6 are provided which project into the flow field of the flow cavity 1. The ignition electrodes 6 are disposed to each other in a manner such that they are spaced apart and are disposed at an obtuse angle to each other. In order not to disturb the flow pattern in the flow channels 2, the ignition electrodes pierce a tetrahedral face and, in particular, in the direction of the centre point of the tetrahedron. Symmetrically disposed between the flow channels 2 are magnets 8. These are provided centrally on each tetrahedral face which bounds the flow cavity 1. At the same time, there are assigned to the magnets 8 pole shoes 9 which are mounted adjacently to the channel exit orifices 4 at the apices of the tetrahedron of the flow cavity 1, the magnets 8 and the pole shoes 9 being joined in each case by means of an iron yoke 10. As a result of this magnet arrangement a stray magnetic field is generated whose magnetic flux lines in each case run parallel to the longitudinal axis of the flow channels 2 and parallel to the centre point perpendiculars on the tetrahedral faces of the flow cavity 1, while the central region of the tetrahedral cavity 1 remains relatively fieldfree. The magnets 8 are at the same time directed towards the turbulent flow centre with the same polarity.

Each flow channel 2 has a gas inlet 11 whose discharge orifice is disposed tangentially to the cylindrical inner wall of the flow channels 2. The gas introduced through the gas inlet 11 flows helically at high velocity in the direction of the flow cavity centre, the helical flow axis running along the longitudinal axis of the particular flow channel 2 and parallel to the magnetic flux lines of the stray magnetic field in the region of the common space 3. All the flows are at the same time aligned towards the common space 3 with the same helical direction.

Tapping electrodes 12 are disposed at a boundary wall of a flow channel 2 and in each case in the Laval nozzles 5 assigned to the flow channel 2 in order to be able to tap off the induced voltages.

Figure 2:
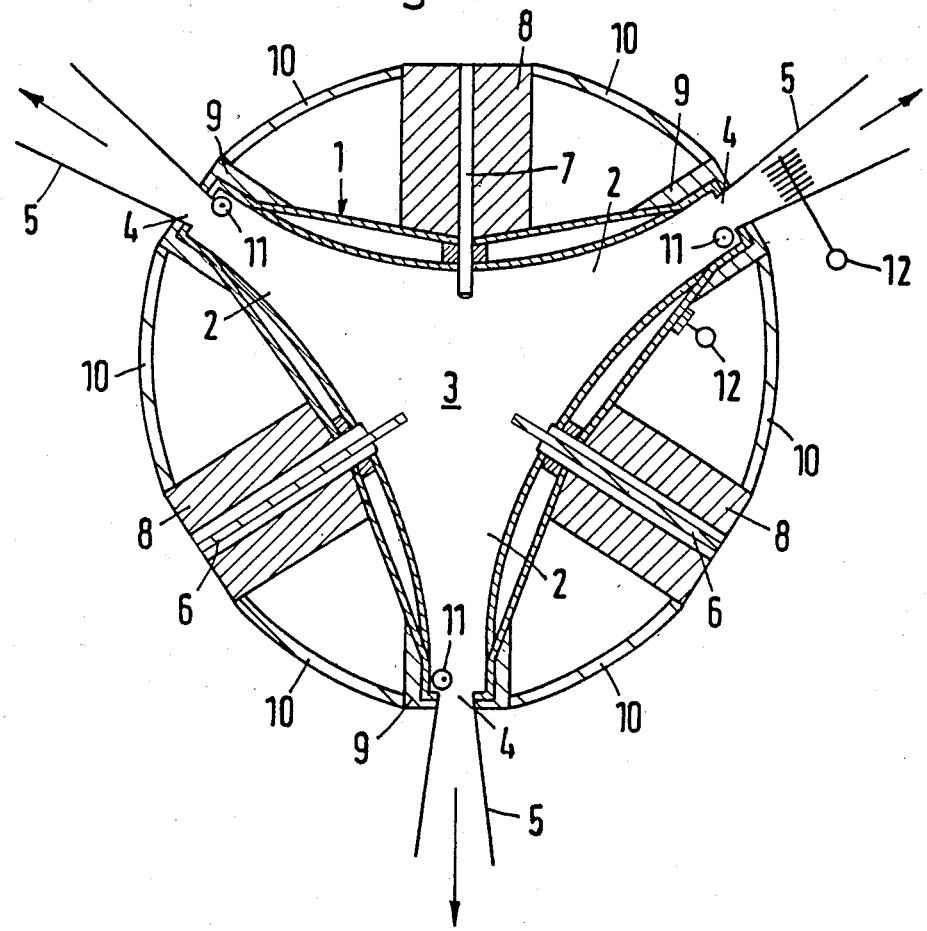
FIG. 2 shows in cross-section a second exemplary embodiment of the MHD generator.

FIG. 2 shows a second exemplary embodiment of the MHD generator in which the generator is provided as a combustion chamber for fossil fuels and/or as a high-seed evaporator. For this purpose the flow cavity 1 has a double shell construction and has a fuel inlet device 7 which is brought into the combustion chamber bounded by the flow cavity 1 in order to supply the chamber with fuel. The generator can consequently find application as a heat exchanger or as a boiler for the efficient use of the heat of combustion.

FIG. 3 shows a flow cavity 1 which is constructed as a circular cylindrical flow chamber with opposite flow channels 2 which are disposed between two magnets 8 adjacent to the ends. At the same time, through the magnets 8 there extend two axially disposed ignition electrodes 6 which are inserted into the flow cavity 1 in a manner such that they are disposed oppositely and symmetrically in relation to the centre of the flow cavity 1. In each end region the flow chamber 1 has gas inlets 11 whose discharge orifices are disposed tangentially to the cylindrical inner wall of the flow cavity 1 in order to form a spiral gas flow in each half of the flow cavity 1. The gas introduced through the gas inlets 11 flows at high velocity and with opposite direction of rotation helically in the direction of the flow chamber centre. The axis of the helical flow at the same time runs along the longitudinal axis of the flow cavity 1 and parallel to the magnetic flux lines of the magnets 8. In an annular gap 13 which is disposed centrally between the flow channels 2 and through which the plasma flows out in a fan-like manner, there are disposed two electrodes 12 parallel to the radial flow pattern of the plasma and perpendicular to the magnetic field of the magnets 8 in order to be able to tap off a voltage induced as a result of the initial Hall effect. To have access to this electromotive force it is in general necessary to use highly heat-resistant electrodes. For the generation of a plasma in the centre of the flow cavity 1 the high-velocity gas emerging through the discharge orifices of the gas inlets 11 is initially ignited in the central region of the flow cavity 1 by means of the ignition electrodes 6, which may initially be connected by an ignition filament, as a result of which the gas reaches a temperature such that it is thermally ionized. Various processes can be used to implement this initial ignition such as, for example, the plasma or marshal gun or a tesla spark gap. The hot gas generated is carried along by the counterflowing helical flows so that, on the MHD principle, an electromotive force is induced which equalizes as a result of recombination effects inside the turbulent current region in the centre of the flow cavity 1, as a result of which a further heating up of the gas in this region is achieved by coupling in a self-contained induction current inside the plasma.

To generate a plasma in the central region of the flow cavity 1 there emerge from the discharge orifices of the gas inlets 11 high-velocity gas flows which move helically in the flow channels 2 towards the common space 3 and meet each other there so that a turbulent current centre is formed. In this process the gas flows all have the same helical direction. Due to the symmetrical flow field in the fow cavity 1 anticyclones which form the supporting mass of the helical flows form in the tangential contact regions of the helical flows. The gas flows directed with the same helical direction at the turbulent current centre and supported by the anticyclones generate, as a reuslt of coming together in the region of the common space 3, a turbulent current region which is initially ignited by means of the ignition electrodes 6. In this way the gas which has flowed in reaches a temperature at which it is thermally ionized. The prerequisites for the generation of an electromotor force on the MHD principle are thereby created. The induced electromagnetic force is not removed from the system, but fed to the turbulent current centre through recombination effects which can take place in this turbulent current region and effect a heating up of the gas. Since energy is consequently continuously fed to the hot gas in the turbulent centre on the magnetoplasmadynamic principle, no further energy needs to be pumped into the system after the initial ignition at the start since energy is continuously fed by hot gas in the turbulent centre on the magnetoplasmadynamic principle. In this connection the turbulent current centre exhibits microturbulences which support the energy generation and is surrounded by a circular closed voltage chain if an annular gap is provided. After the MPD process driven by helical currents has started, the heating-up energy supplied externally can be recovered or removed so that a self-organized heating-up of a gas is achieved which leads to the generation of electrical energy. The ionized gas in the centre of the flow cavity 1 performs a helical movement, i.e. the ions and electrons of the plasma described spiral paths around the flux lines of the magnetic field arrangement. As a result of this a plasma current is induced which generates, parallel to the axis, a magnetic field which encloses, compresses and heats up the hot gas. This process of self-compression by a plasma current is described as plasma pinch.

Consequently, in the MHD generator the fulfilment of the criteria for a fusion plasma is possible as a result of the pinch effect in combination with a continuous boost heating generated by the MPD process.

According to the first and second exemplary embodiment the hot gas from the turbulent gas current centre flows back again through the flow channels 2 in the direction of the channel exit orifice 4. This exit flow is generated by the fact that the helical flows in the turbulent current centre flowing in undergo a flow reversal with the result that the emerging gas flows move coaxially with the longitudinal axis of the particular flow channel 2 through the helical flow in the direction of the channel exit orifice 4. At the same time the original helical flow gradually becomes, over an extended spiral path, a parallel gas flow. In order to be able to remove in an expansion process the remaining residual charge which was not eliminated in the central region, the emerging gases, after exiting through the channel exit orifice 4 flow through a Laval nozzle 5 in which the exit gases again undergo a pressure release phase with acceleration and cooling. In this process the gas rapidly loses its conductivity, the embedded charge carriers of the polarized exit flow undergoing, as a result of being transported in the Laval nozzle, a considerably voltage boost due to the charge separation. This electrical energy can be tapped off with electrodes 12 in the Laval nozzle 5 and at an assigned boundary wall of a flow channel 2. An electrostatic generator stage is thus created which exploits the residual dynamics of an MHD generator.

The said MHD generator therefore makes it possible on the one hand to generate and contain in a self-organized manner a discharge plasma in the flow cavity 1 and, in particular, inside the central region which remains relatively free of the stray magnetic field generated by a magnetic arrangement of magnets acting in the same direction, and on the other hand, makes possible the connection in series of a low-temperature stage for electrostatic energy generation. The limitation of the plasma to a spherical contained plasma offers good preconditions for the permanent enclosure of a very high-temperature plasma for nuclear research and fusion technology.

I claim:

1. A method for generating a plasma by heating a flowing gas comprising the steps of:
    providing a cavity which encloses a plurality of flow channels that terminate in a common space, the cavity including gas exit orifices;
    establishing magnetic fields having flux lines within each channel, said flow lines being oriented generally parallelly to the axes of the channels;
    discharging a gas within each channel to produce a helical flow pattern around the flux lines as the gas moves toward the common space where the helical flows meet each other and form a zone of turbulence;
    heating the turbulent gas zone until sufficient electrical energy is generated to effect a self-organized heating up and boost heating of the gas;
    whereby Hall currents are established in the heated turbulent gas, the Hall currents producing axially parallel magnetic fields which compress and further heat up the gas to a plasma by the pinch effect; and
    exhausting the plasma from the flow cavity, through the gas exit orifices.

2. Process according to claim 1, characterized in that the hot gases emerging from the flow cavity are conveyed through Laval nozzles, the electrical energy generated as a result being tapped off.

3. The method of claim 1 wherein the hot gases emerging from the cavity exit orifices magnetoplasmadynamically generate an electromotive force which is coupled into the center of the Hall current.

4. An MHD generator comprising:
    means for defining a cavity, said cavity including a plurality of flow channels that terminate in a common enclosed space;
    magnetic field generating means positioned adjacent said cavity, said field generating means producing and maintaining magnetic fields having lines of flux within and parallel to the longitudinal axis of each flow channel;
    means defining a gas inlet in each flow channel for discharging gas tangentially into the flow channel boundary, thereby producing a gas flow which moves helically around the magnetic flux lines toward the common space whereby a plasma is generated in said cavity;
    means defining a gas exit orifice associated with each flow channel for exhausting the plasma from the cavity; and
    at least a pair of electrode means associated with each flow channel, said electrodes being oriented perpendicularly with respect to the direction of the magnetic field and the direction of current flow in said plasma, current being induced in said electrode means.

5. MHD generator according to claim 4, characterized in that the flow cavity (1) is essentially tetrahedrally shaped, four flow channels (2) being tetrahedrally disposed to each other and aligned to the symmetry centre of the flow cavity (1) in the region of the common space (3).

6. MHD generator according to claim 5, characterized in that magnets (8) with assigned pole shoes (9) are provided on an iron yoke (10) each as a connecting part, the magnets (8) and the pole shoes (9) being disposed adjacently to the flow cavity (1) in a manner such that a stray magnetic field is generated whose magnetic flux lines run parallel to the longitudinal axis of the particular flow channel (2), while the common space (3) remains essentially field-free.

7. MHD generator according to claim 4, characterized in that the flow cavity (1) is constructed as a circular cylindrical flow chamber in which the tangential gas inlets (11) are disposed opposite for the generation of opposite gas flows of opposite direction so that the gas flows move helically around the magnetic flux lines in the direction of the symmetry plane perpendicular to the axis of the flow cavity (1) or to the flux lines of the axial magnetic field, the flow cavity (1) having a centrally disposed encompassing annular gap (13).

8. MHD generator according to claim 4 characterized in that the exit orifices (4) have each a Laval nozzle (5) expanding outwards.

9. MHD generator according to claim 4 characterized in that at least two axial ignition electrodes (6), spaced with respect to each other, project into the common space (3), the ignition electrodes (6) being constructed in particular as plasma guns which can be operated in push-pull.

10. MHD generator according to claim 4, characterized in that at least one fuel inlet device (7) is provided which injects fuel into a flow cavity with double-shell construction.

11. The process of claim 2 wherein the hot gases emerging from the flow cavity are discharged through Laval nozzles.

12. The MHD generator of claim 7 wherein each exit orifice is provided with a Laval nozzle which discharges outwardly with respect to the said common space.

13. The MHD generator of claim 7 wherein at least two spaced igniters project into the said common space, the said igniters comprising plasma guns.

14. The MHD generator of claim 8 wherein at least two spaced igniters project into the said common space, the said igniters comprising plasma guns.

15. The MHD generator of claim 12 wherein at least two spaced igniters project into the said common space, the said igniters comprising plasma guns.

16. An MHD generator according to claim 7 wherein the flow cavity is characterized by a double-shell construction and wherein said apparatus further comprises means for delivering fuel into said flow cavity.

17. An MHD generator according to claim 12 wherein the flow cavity is characterized by a double-shell construction and wherein said apparatus further comprises means for delivering fuel into said flow cavity.

18. An MHD generator according to claim 15 wherein the flow cavity is characterized by a double-shell construction and wherein said apparatus further comprises means for delivering fuel into said flow cavity.

19. An MHD generator according to claim 5 wherein the flow cavity is characterized by a double-shell construction and wherein said apparatus further comprises means for delivering fuel into said flow cavity.

20. An MHD generator according to claim 13 wherein the flow cavity is characterized by a double-shell construction and wherein said apparatus further comprises means for delivering fuel into said flow cavity.

* * * * *